June 14, 1927.  F. M. SPURR  1,632,516
AUTOMATIC VALVE FOR USE IN FISH STALLS AND LIKE PLACES
Filed Jan. 23, 1924
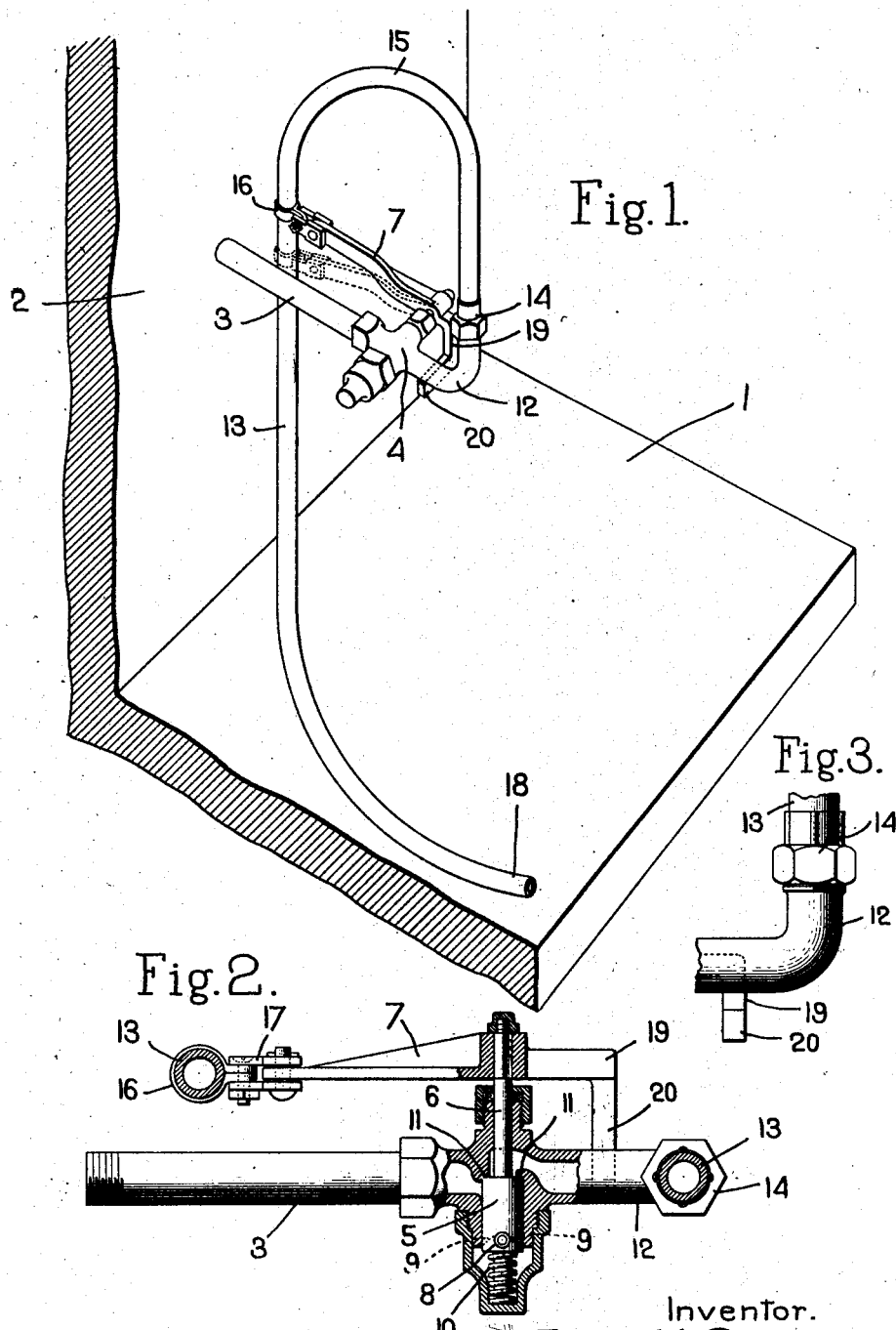
Inventor.
Foster M. Spurr
by Heard Smith & Tennant.
Attys.

Patented June 14, 1927.

1,632,516

UNITED STATES PATENT OFFICE.

FOSTER M. SPURR, OF MATTAPAN, MASSACHUSETTS.

AUTOMATIC VALVE FOR USE IN FISH STALLS AND LIKE PLACES.

Application filed January 23, 1924. Serial No. 687,935.

Fish stalls and other similar places where fish is sold at retail are usually equipped with a faucet situated above the bench on which the fish are cleaned and a flexible hose connected to the faucet, this equipment being for the purpose of washing the fish as they are cleaned.

The devices of this sort which are now in common use have a valve which has to be manually opened and manually closed, and in using such devices, therefore, the person cleaning the fish has to reach up and open the faucet when he wishes to wash the fish, and after the fish is washed by manipulating the flexible hose and directing the stream of water onto it, such person has to reach up to the faucet again and close it off. This continual opening and closing of the faucet not only consumes considerable time, especially on busy days when sales are being rapidly made, but it also requires considerable manual effort on the part of the operator.

It is one of the objects of my invention to provide an improved faucet or valve for this use which is so constructed that the valve can be opened by merely pulling slightly on the flexible hose, and will be closed automatically when the pulling strain is released. With my improvements, therefore, the necessity of continually reaching up to open and close the faucet is obviated and all the operator has to do when he wishes to wash fish is simply to seize the end of the flexible hose, pull on it slightly thereby opening the valve and then manipulate the hose to perform the fish-washing operation. When this operation is completed the operator merely releases the hose and the valve will then automatically close.

In order to give an understanding of the invention I have illustrated in the drawings a selected embodiment thereof which will now be described after which the novel features will be pointed out in the appended claims.

Fig. 1 is a perspective view illustrating a valve embodying my apparatus;

Fig. 2 is a horizontal sectional view showing the valve in section;

Fig. 3 is a fragmentary view showing the stop finger 20.

In the drawings 1 indicates generally a bench or cutting table on which fish may be dressed. Extending from the wall 2 above the bench or table is a water supply pipe 3 to which my improved valve 4 is connected.

While any suitable valve may be used I will preferably use a self-closing valve of some type and one which has a handle or arm extending therefrom by which it may be opened or closed.

In the construction herein shown the valve device comprises the valve element 5 having a stem 6 extending therefrom to which is rigidly secured an arm 7 by which the valve may be opened. The valve element is shown as a cylindrical member which has projections or rolls 8 extending therefrom that co-operate with cam faces 9 formed in the valve casing, these cam faces presenting between them a recess in which the roll is received. 10 is a spring acting against the valve and by which it is seated. When the arm 7 is turned thereby to turn the stem 6 and valve, the rolls 8 ride up one or the other of the inclined faces 9 and move the valve bodily away from its seat 11, thus opening the valve, this operation compressing the spring 10. When the arm 7 is released the spring urges the valve forwardly against its seat causing the rolls 8 to ride down the inclined faces 9.

While the valve thus described is a satisfactory one yet I desire to state that so far as the invention is concerned the constructional details of the valve may be varied, it only being necessary that the valve should be a self-closing valve and one which has an arm extending therefrom by which it may be opened.

The valve has an outlet pipe 12 extending therefrom which is herein shown as being directed upwardly and to which a flexible hose 13 is connected in any suitable way as by means of a coupling 14. The portion of the hose adjacent the valve is bent to form an inverted U-shaped portion 15 and the arm 7 is connected to the opposite side of the U-shaped portion from that which is secured to the valve.

Any suitable connection between the arm 7 and the hose may be employed. That herein shown comprises a clamping ring 16 which is clamped about the hose and which is connected to the arm 7 by a flexible link connection 17, the purpose of the link connection being to prevent any binding of the parts.

With this construction it will be observed that while normally the valve will be closed as shown in Fig. 2 yet when the hose 13 is pulled downwardly slightly the arm 7 will be moved downwardly into the dotted line position Fig. 1 thereby opening the valve. As soon as the pulling strain on the hose is released the valve will automatically close.

Whenever the person using the device desires a supply of water from the hose 13 he simply seizes the end of the hose and pulls on it slightly thus opening the valve and permitting the water to flow. While maintaining the pulling strain he then may manipulate the end 18 of the hose as necessary to wash the fish or to flush the bench 1 and when the washing or flushing operation is completed he simply releases the hose when the valve will be automatically closed.

The U-shaped portion 15 of the hose provides the necessary flexible connection for allowing the valve arm 7 to be moved up and down. The spring for closing the valve must be not only sufficiently strong to close the valve properly but must also be strong enough to lift the weight of the hose as the arm 7 moves upwardly in closing the valve. The arm 7 thus not only is the means for opening the valve but it also constitutes a support for the hose when the latter is not in use.

If desired, the arm 7 may be formed with an extension 19 having a stop finger 20 that extends underneath the delivery end 12 of the pipe, said stop serving to limit the downward movement of the arm 7 and, therefore, the opening movement of the valve. The advantage of this stop is that it prevents any injury to the valve by the application of undue pulling strain on the hose 13, such as might be occasioned by a careless person giving the hose a violent pull.

While I have herein shown the invention as installed for washing fish yet it will be obvious that it is applicable for other purposes, such for instance as for flushing sinks or filling receptacles in restaurants or in any place where water is to be frequently drawn from a faucet for the purpose of filling various receptacles or for flushing operations, etc.

I claim:—

1. The combination with a self-closing valve comprising a rotary valve element having an arm rigid therewith, which arm by its downward swinging movement opens the valve, a flexible hose secured to the valve, said hose extending upwardly from the valve and then downwardly thereby forming an inverted U-shaped portion, a clamp secured to the free side of the U-shaped portion, and a link pivotally connecting the arm and the clamp whereby a downward pull on the hose will open the valve.

2. The combination with a bench or table, of a self-closing valve situated above the latter and having a horizontally-extending arm by which it may be opened, a flexible hose connected to the valve and extending upwardly therefrom and then bent into U formation and extending downwardly to the bench or table, means for connecting the arm to the free end of the U-shaped portion of the hose, and a stop finger extending downwardly from said arm and having a laterally extending portion adapted to engage the under side of the valve thereby to limit the valve-opening movement of the arm.

In testimony whereof, I have signed my name to this specification.

FOSTER M. SPURR.